United States Patent [19]  
Hinai et al.

[11] 4,326,248  
[45] Apr. 20, 1982

[54] MULTIPLE VIRTUAL STORAGE CONTROL SYSTEM

[75] Inventors: Mamoru Hinai; Chikahiko Izumi; Kazuo Hibi, all of Hadano, Japan

[73] Assignee: Hitachi, Ltd., Tokyo, Japan

[21] Appl. No.: 14,274

[22] Filed: Feb. 22, 1979

[30] Foreign Application Priority Data

Feb. 22, 1978 [JP] Japan ................................ 53-18471

[51] Int. Cl.³ .......................... G06F 9/36; G06F 13/00
[52] U.S. Cl. .................................................... 364/200
[58] Field of Search ... 364/200 MS File, 900 MS File

[56] References Cited

U.S. PATENT DOCUMENTS

| 3,725,874 | 4/1973 | Van-Heel | 364/200 |
| 4,053,948 | 10/1977 | Hogan | 364/200 |
| 4,068,303 | 1/1978 | Morita | 364/200 |
| 4,096,573 | 6/1978 | Heller | 364/200 |

Primary Examiner—James D. Thomas  
Assistant Examiner—John G. Mills  
Attorney, Agent, or Firm—Craig and Antonelli

[57] ABSTRACT

A multiple virtual storage control system for a data processing system for handling a plurality of virtual spaces is disclosed. Virtual addresses indicative of addresses in the virtual spaces are translated to real addresses by a translation table. When a new virtual space is established by setting a first address or segment table origin address (STO address) of the translation table, a virtual space number is assigned to the established virtual space by an STO address stack, which comprises a definite number of registers. The number of virtual space numbers assigned is larger than the number of registers. The virtual addresses and the corresponding real addresses are stored in a high-speed address translator so that the virtual addresses are translated to the real addresses at a high speed. When an overflow of the virtual space number assigned in the STO address stack takes place, the plurality of virtual spaces registered in the high-speed address translator are simultaneously purged.

6 Claims, 10 Drawing Figures

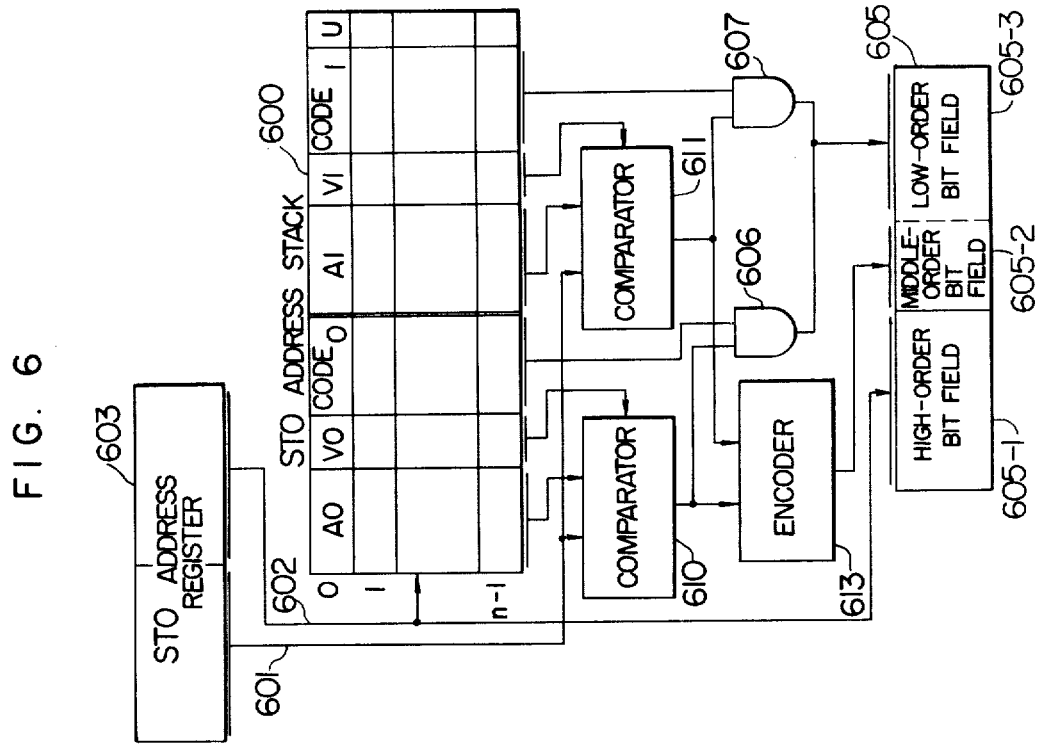

FIG. 7

| NO. | STO ADDRESS | i-TH COLUMN OF STO ADDRESS STACK | | | | | | | VIRTUAL SPACE NUMBER REGISTER | | | |
|---|---|---|---|---|---|---|---|---|---|---|---|---|
| | | A0 | V0 | CODE 0 | A1 | V1 | CODE 1 | U | | | | |
| 0 | INITIAL STATE | ╱ | 0 | 00 | ╱ | 0 | 00 | 0 | | | | |
| 1 | Ai | A | 1 | 00 | ╱ | 0 | 00 | 1 | i | 0 | 00 | |
| 2 | Bi | A | 1 | 00 | B | 1 | 00 | 0 | i | 1 | 00 | |
| 3 | Ci | C | 1 | 01 | B | 1 | 00 | 1 | i | 0 | 01 | |
| 4 | Di | C | 1 | 01 | D | 1 | 01 | 0 | i | 1 | 01 | |
| ⋮ | | | | | | | | | | | | |
| 8 | Hi | G | 1 | 11 | H | 1 | 11 | 0 | i | 1 | 11 | PURGE INDICATION "i0" |
| 9 | Ji | J | 1 | 00 | H | 1 | 11 | 1 | i | 0 | 00 | |
| 10 | Ki | J | 1 | 00 | K | 1 | 00 | 0 | i | 1 | 00 | PURGE INDICATION "i1" |
| 11 | Li | L | 1 | 01 | K | 1 | 00 | 1 | i | 0 | 01 | |
| 12 | Ki | L | 1 | 01 | K | 1 | 00 | 0 | i | 1 | 00 | |
| 13 | Mi | M | 1 | 10 | K | 1 | 00 | 1 | i | 0 | 10 | |
| 9' | Ji | J | 1 | 00 | ╱ | 0 | 00 | 1 | i | 0 | 00 | PURGE INDICATION "i" |
| 10' | Ki | J | 1 | 00 | K | 1 | 00 | 0 | i | 1 | 00 | |

FIG. 9A

| No. | STO ADDRESS | i-TH COLUMN OF STO ADDRESS STACK | | | | | | | | | | VIRTUAL SPACE NUMBER REGISTER | | | |
|---|---|---|---|---|---|---|---|---|---|---|---|---|---|---|---|
| | | A00 | V00 | A01 | V01 | CODE0 | A10 | V10 | A11 | V11 | CODE1 | U | | | |
| 0 | INITIAL STATE | / | 0 | / | 0 | 00 | / | 0 | / | 0 | 00 | 0 | | | |
| 1 | Ai | A | 1 | / | 0 | 00 | / | 0 | / | 0 | 00 | 1 | i | 00 | 00 |
| 2 | Bi | A | 1 | / | 0 | 00 | B | 1 | / | 0 | 00 | 0 | i | 10 | 00 |
| 3 | Ci | A | 1 | C | 1 | 00 | B | 1 | / | 0 | 00 | 1 | i | 01 | 00 |
| 4 | Di | A | 1 | C | 1 | 00 | B | 1 | D | 1 | 00 | 0 | i | 11 | 00 |
| 5 | Ei | E | 1 | / | 0 | 01 | B | 1 | D | 1 | 00 | 1 | i | 00 | 01 |
| 6 | Fi | E | 1 | / | 0 | 01 | F | 1 | / | 0 | 01 | 0 | i | 10 | 01 |
| 7 | Gi | E | 1 | G | 1 | 01 | F | 1 | / | 0 | 01 | 1 | i | 01 | 01 |
| 8 | Hi | E | 1 | G | 1 | 01 | F | 1 | H | 1 | 01 | 0 | i | 11 | 01 |
| 16 | Ri | N | 1 | Q | 1 | 11 | P | 1 | R | 1 | 11 | 0 | i | 11 | 11 | PURGE INDICATION "$i_0$" |
| 17 | Si | S | 1 | / | 0 | 00 | P | 1 | R | 1 | 11 | 1 | i | 00 | 00 |
| 18 | Ti | S | 1 | / | 0 | 00 | T | 1 | / | 0 | 00 | 0 | i | 10 | 00 |
| 19 | Ui | S | 1 | U | 1 | 00 | T | 1 | / | 0 | 00 | 1 | i | 01 | 00 | PURGE INDICATION "$i_1$" |
| 17' | Si | S | 1 | / | 0 | 00 | / | 0 | / | 0 | 00 | 1 | i | 00 | 00 |
| 18' | Ti | S | 1 | / | 0 | 00 | T | 1 | / | 0 | 00 | 0 | i | 10 | 00 | PURGE INDICATION "i" |

FIG. 9B

| NO. | STO ADDRESS | \multicolumn{8}{c|}{i-TH COLUMN OF STO ADDRESS STACK} | VIRTUAL SPACE NUMBER REGISTER | |
|---|---|---|---|---|---|---|---|---|---|---|---|
| | | A00 | V00 | A01 | V01 | CODE 0 | A10 | V10 | A11 | V11 | CODE 1 | | |
| 0 | INITIAL STATE | / | 0 | / | 0 | 00 | / | 0 | / | 0 | 00 | | |
| 1 | Ai | A | 1 | / | 0 | 00 | / | 0 | / | 0 | 00 | i | 00 00 |
| 2 | Bi | A | 1 | B | 1 | 00 | / | 0 | / | 0 | 00 | i | 01 00 |
| 3 | Ci | A | 1 | B | 1 | 00 | C | 1 | / | 0 | 00 | i | 10 00 |
| 4 | Di | A | 1 | B | 1 | 00 | C | 1 | D | 1 | 00 | i | 11 00 |
| 5 | Ei | E | 1 | / | 0 | 01 | C | 1 | D | 1 | 00 | i | 00 01 |
| 6 | Fi | E | 1 | F | 1 | 01 | C | 1 | D | 1 | 00 | i | 01 01 |
| 7 | Gi | E | 1 | F | 1 | 01 | G | 1 | / | 0 | 01 | i | 10 01 |
| 8 | Hi | E | 1 | F | 1 | 01 | G | 1 | H | 1 | 01 | i | 11 01 |
| 16 | Ri | N | 1 | P | 1 | 11 | Q | 1 | R | 1 | 11 | i | 11 11 |
| 17 | Si | S | 1 | / | 0 | 11 | Q | 1 | R | 1 | 11 | i | 00 00 |
| 18 | Ti | S | 1 | T | 1 | 00 | Q | 1 | R | 1 | 11 | i | 01 00 |
| 19 | Ui | S | 1 | T | 1 | 00 | U | 1 | / | 0 | 00 | i | 10 00 |
| 17' | Si | S | 1 | / | 0 | 00 | / | 0 | / | 0 | 00 | i | 00 00 |
| 18' | Ti | S | 1 | T | 1 | 00 | / | 0 | / | 0 | 00 | i | 01 00 |
| 19' | Ui | S | 1 | T | 1 | 00 | U | 1 | / | 0 | 00 | i | 10 00 |

PURGE INDICATION "i₀" (at rows 16→17)

PURGE INDICATION "i₀" (at row 19)

PURGE INDICATION "i" (at rows 17'–18')

MULTIPLE VIRTUAL STORAGE CONTROL SYSTEM

BACKGROUND OF THE INVENTION

The present invention relates to a multiple virtual storage control system for an electronic computer.

Modern electronic computer systems have adopted a multiple virtual storage system to realize efficient utilization of a central processor which is one of the resources of the system. Various attempts have also been made with regard to the central processor in order to realize a more efficient multiple virtual storage system.

In the virtual storage system, addresses of an instruction fetch and an operand fetch indicated by an instruction are recognized as logical addresses which do not correspond to a real storage. Accordingly, in referring to the storage, the logical address must be translated to a real address which corresponds to the real storage in one-to-one correspondence. The virtual storage represented by the logical address is divided into segments each of which is divided in pages each consisting of a predetermined number of bytes. The translation of the logical address to the real address is effected by referring to a translation table in the storage, which table comprises a segment table and a page table. The segment table is referred to by a sum of a first address of the segment table (hereinafter referred to as a Segment Table Origin address or STO address) and a segment address portion of the logical address. This entry includes a preset first address of the page table (hereinafter referred to as a Page Table Origin address or PTO address), and an entry of the page table which is a sum of the PTO address and a page address portion of the logical address is referred to. This latter entry includes a preset real address, which is linked to a byte address to determine the real address.

The above translation operation requires a large time because two tables in the storage must be referred to. As an approach to solve the problem, a high-speed address translator has been proposed. In this approach, a real address which has been determined by referring to the translation table in the storage is stored in the high-speed address translator in pair with the logical address so that when the same logical address of the storage is to be subsequently referred to, the corresponding real address is determined by the high-speed address translator. In this manner, the address translation operation can be effected at a higher speed.

In an electronic computer system capable of handling multiple virtual spaces, additional STO addresses are established to identify a plurality of virtual spaces triggered and virtual space numbers are assigned to the triggered virtual spaces. The virtual space numbers are stored in the high-speed address translator in one-to-one correspondence, which are used to examine the identity when the logical address is translated to the real address using the high-speed address translator.

The virtual space numbers are assigned using an STO address stack in which the STO address is stored. The STO address stack comprises a limited number of (e.g. four) registers each corresponding to a virtual space number. When a newly established STO address has not been stored in the STO address stack, this STO address is stored in any register, to thereby assign a virtual space number. In registering the address pair to the high-speed address translator, this virtual space number is also stored. When the address translation is requested, not only the identity between the logical address to be translated and the logical address in the translator but also the identity between the virtual space number being selected and the virtual space number stored in one-to-one correspondence with the address pair are examined to determine the real address.

In this manner, four STO addresses are stored in the STO address stack, and when an additional STO address is established it is stored in place of one of the previously registered STO addresses. Since the virtual space number for the old STO address which is now replaced by the new one is identical to the virtual space number for the newly stored STO address, it is necessary to cancel the address pair in the high-speed address translator, which was established based on the old STO address. This is carried out by examining if that virtual space number has been registered for all of the entries to the high-speed address translator and, if it has been registered, invalidating that entry. This cancellation operation is called virtual space purge. The virtual space purge requires checking of all of the entries in the high-speed address translator and hence a large amount of time is necessary. The necessity of the virtual space purge for each change of the virtual space lowers the performance of the electronic computer system. When the virtual space is changed, if the STO address has been registered in the STO address stack, only the virtual space number need be changed and the virtual space purge is not initiated.

The above-mentioned prior art is referred to in for example, U.S. Pat. No. 3,902,163 entitled "Buffered Virtual Storage and Data Processing System" by Gene M. Amdahl et al., and U.S. Pat. No. 3,781,808 entitled "Virtual Memory System" by Thomas P. Ahearn et al. Thus, in the prior art, the number of the virtual space number is equal to the number of the STO address stack registers and virtual space purge in the high-speed translator is effected by cancelling address translation pairs on one virtual space number at each time. Therefore, virtual space purge is performed every time of changeover of virtual space, thus lowering the performances of computer system.

SUMMARY OF THE INVENTION

It is an object of the present invention to provide a multiple virtual storage control system which can reduce the frequency of the cancellation of the high-speed address translator due to the changeover of the virtual space.

The multiple virtual storage control system of the present invention includes first and second means. The first means for assigning a virtual space number to a first address of a supplied translation table has a plurality of first storage locations such as, for example, a STO address stack for storing the first address in correspondence with the virtual space number. If the supplied first address does not exist at any of the first storage locations in said STO address stack, the first means assigns a virtual address number to the first address and stores the first address in a first address location in correspondence with the virtual space number and provides the assigned virtual space number. If the supplied first address exists in the first storage locations, the first means provides the virtual space number assigned to the first address. By the use of an arrangement such as, for example, a register for storing virtual space numbers and means for incrementing the virtual space code, the first means further establishes more virtual space numbers than the number of the first storage locations and produces a signal when a predetermined space number is assigned.

The second means such as a high-speed address translator for providing a real address corresponding to the supplied virtual address and the virtual space number has a plurality of second storage locations for storing the virtual addresses, the real addresses and the virtual space numbers in correspondence therewith. The second means responds to the signal from the first means to invalidate the content of the second storage locations which contain the virtual space numbers corresponding to the plurality of virtual space numbers relating to the virtual space numbers from the first means. Therefore, due to the assignment by the first means of more virtual space numbers than the number of the first storage locations, it becomes unnecessary to purge the translator whenever an additional first address is established in place of a prior first address, as was required in the prior art. Instead, all of the virtual spaces based on the virtual space numbers from the first means are purged at once, to thereby reduce the frequency of purging.

BRIEF DESCRIPTION OF THE DRAWINGS

FIG. 5 is a chart used to explain the operation of FIGS. 2 and 3 and illustrates a relation among a supplied STO address, the content of an STO address stack and an assigned virtual space number.

FIG. 6 shows another embodiment of the present invention and shows a block diagram of the STO address stack and peripheral circuits thereof.

FIG. 7 is a chart used to explain the operation of FIG. 6 and illustrates a relation among the supplied STO address, the content of the STO address stack and the assigned virtual space number.

FIGS. 9A and 9B are charts used to explain the operation of FIG. 8 and illustrate a relation among the supplied STO address, the content of the STO address stack and the assigned virtual space number.

DESCRIPTION OF THE PREFERRED EMBODIMENTS

Figure 1:
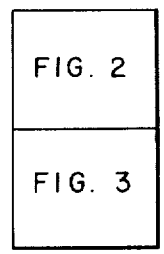
FIG. 1 shows an arrangement of FIGS. 2 and 3.
Figure 2:
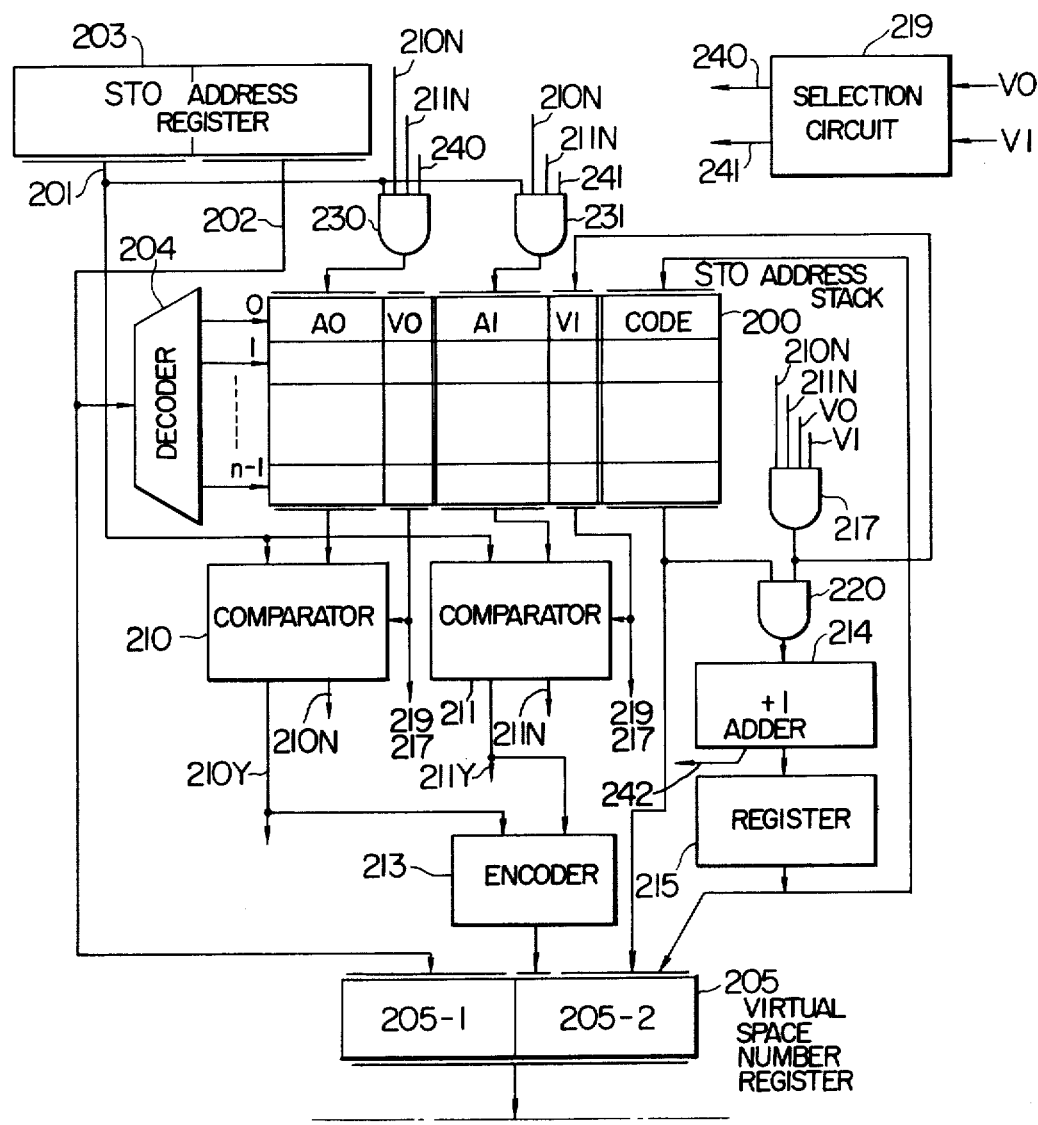
FIGS. 2 and 3 are block diagrams showing one embodiment of the present invention.
Figure 3:
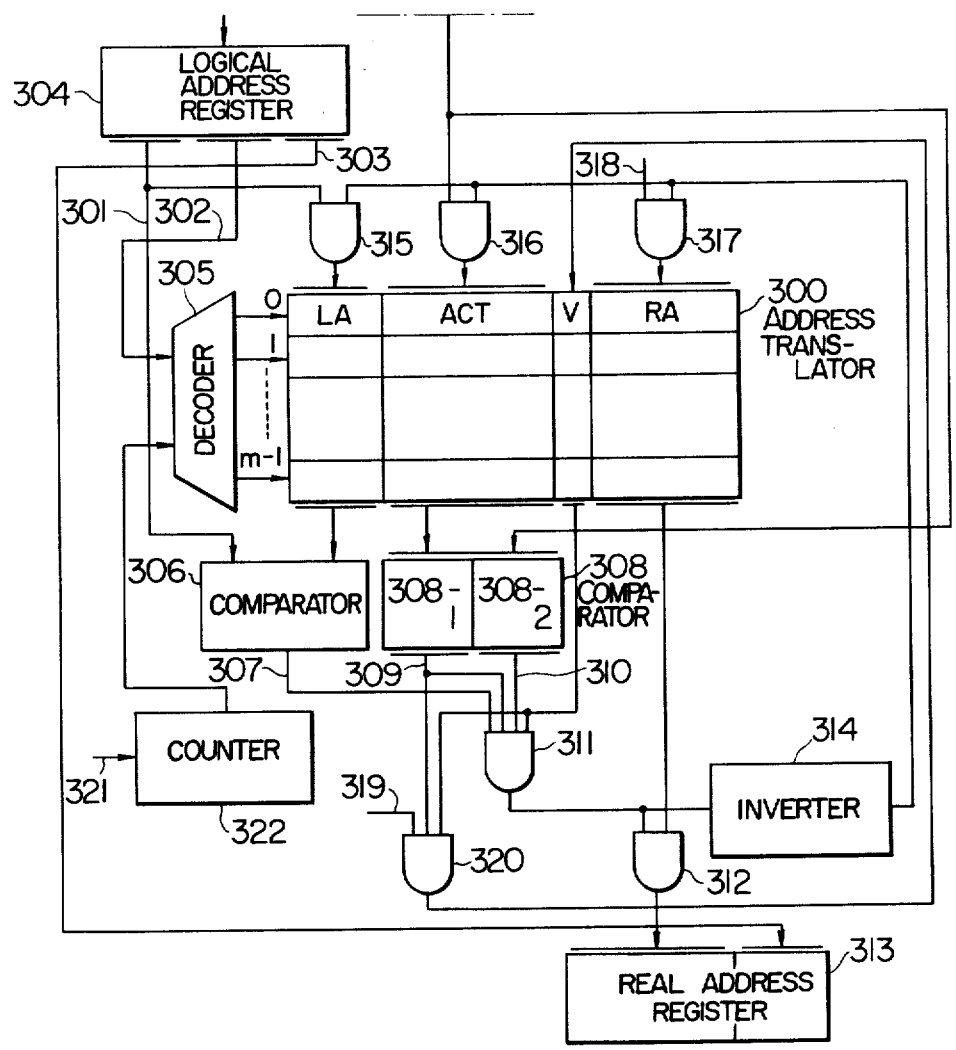

FIGS. 2 and 3 show one embodiment of the present invention with arrangement of FIG. 1. A STO address stack 200 comprises 2n entries which are comprised of n columns×2 rows. Each column comprises an address field AO and a valid flag VO for indicating the validity thereof, an address field Al and a valid flag Vl for indicating the validity thereof, and a virtual space code field CODE. The CODE may comprise two bits which are all "0" during initialization. Since the column of the STO address stack 200 is selected when low-order bits of an STO address register 203 are decoded by a decoder 204, there exists a relation of $2^a = n$ where a is a bit number of the low-order bits.

When the validity of the STO address is indicated by the STO address register 203, the low-order bit thereof selects one of the columns of the STO address stack 200 through a line 202. The pairs of AO, VO and Al, Vl of the column read out of the STO address stack 200 are supplied to one of the input terminals of comparators 210 and 211, respectively. The high-order bit of the STO address register 203 is supplied to the other input terminals of the comparator 210 and 211 through a line 201. The comparators 210 and 211 provide outputs on lines 210Y and 211Y, respectively, when both inputs thereto are equal, while they provide outputs on line 210N and 211N, respectively, when both inputs thereto are not equal, or when VO or Vl indicates invalidity ("0").

When one of the comparators produces the equality output, the low-order bit of the STO address register 203 is registered in a high-order bit field 205-1 of a virtual space number register 205. The equality output is supplied to an encoder 213, which produces a "0" output when the equality output is produced on the line 210Y and a "1" output when it is on the line 211Y. This output is registered in the highest order position of a low-order bit field 205-2 of the register 205. An output from the CODE field of the stack 200 is also registered in the low-order bit field 205-2 of the register 205. It constitutes a virtual space number for the STO address register 203.

Figure 4:
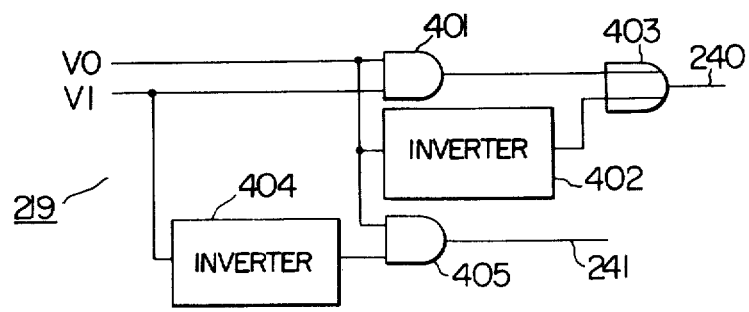
FIG. 4 shows a specific embodiment of a selection circuit shown in FIG. 2.

When both comparators 210 and 211 produce the non-equality outputs, it is necessary to open one of AND gates 230 and 231 to enter the high-order bit of the STO address register 203 to one entry of the STO address stack 200. Then, it is necessary to assign a new virtual space number to the address. A selection circuit 219 determines which one of the AND gates 230 and 231 is to be opened (that is, whether the high-order bit of the STO address register is to be stored in AO or Al). One embodiment of the selection circuit 219 is shown in FIG. 4. When both VO and Vl indicate the validity ("1"), the AND gate 401 is opened to pass the output to a line 240 through an OR gate 403. When VO indicates the invalidity ("0"), the output is also passed to the line 240 through an inverter 402 and the OR gate 403. Vl is applied to an AND gate 405 through an inverter 404 so that the AND gate 405 is opened when VO indicates the validity and Vl indicates the invalidity, to pass the output to a line 241. Consequently, when both comparators 210 and 211 produce non-equality outputs, the high-order bit of the STO address register 203 is stored at AO if both VO and Vl indicate validity or invalidity, and at the entry of invalidity if one of VO and Vl indicates the invalidity.

When the non-equality is shown by both comparators 210 and 211 as a result of comparison, it is necessary to store the high-order bit of the STO address in the STO address stack 200 and then assign a new vertical space number as stated above. In that case, the process for carrying this out is divided into two different cases depending on the status of VO and Vl.

When the comparators 210 and 211 show the non-equality and at least one of VO and Vl indicates the invalidity:

The selection circuit 219 produces the signal on either one of the lines 240 and 241, as described above, so that corresponding one of the AND gates 230 and 231 is opened. As a result, the high-order bit of the STO address register 203 is stored in AO or Al of the column of the STO address stack 200 specified by the low-order bit of the STO address register 203. At the same time, the corresponding V bit is set to "1". As a result of setting the new STO address, the corresponding comparator 210 or 211 produces the equality signal, and the low-order bit of the STO address register 203, the output of the encoder 213 and the content of the CODE field of the STO address stack 200 are registered in the virtual space number register 205.

When the comparators 210 and 211 show the non-equality and both V0 and V1 indicate the validity:

Since both V0 and V1 indicate the validity (both entries have been used), the AND gate 217 is opened and the content in the CODE field read out of the STO address stack 200 together with A0 and A1 is applied to an add-one adder 214 through an AND gate 220 and the resulting output is stored in a register 215. At the same time, the AND gate 230 is opened by the signal from the line 240 of the selection circuit 219 so that the high-order bit of the STO address register 203 is stored at A0 of the corresponding column of the STO stack 200 and the corresponding V0 is set to "1". At the time, the incremented virtual space code of the register 215 is also stored in the CODE field. As the content of the CODE field is changed, the V1 field of the corresponding column is invalidated by the output of the AND gate 217. Thereafter, the address on the line 202 is registered in the high-order bit field 205-1 of the virtual space number register 205, and the output of the encoder 213 and the new code number of the register 215 are registered in the low-order bit field 205-2.

During the above operation, a carry may be produced from the highest order bit position of the add-one adder 214. That is, when all of the codes prepared for the identification of the virtual space numbers have been used, a signal is produced on a virtual space purge indication line 242. The signal on the line 242 is supplied to a control unit (not shown).

FIG. 3 shows a high-speed address translator 300 and peripheral circuits thereof. The high-speed address translator 300 comprises m entries each having a logical address field LA and a real address field RA in which an address pair of a logical address and a real address are retained. Each entry further includes a virtual space number field ACT for retaining a virtual space number for the address pair and a valid flag V for indicating the validity of that entry. When the logical address is set into a logical address register 304, a middle-order address field thereof (e.g. page address field) is supplied to a decoder 305 through a line 302 to select one of the entries of the high-speed address translator 300. The content of the LA field (which retains a high-order address field, e.g. a segment address field, of the logical address) of the entry read out of the high-speed address translator 300 is supplied to a comparator 306 while the content of the ACT field is supplied to a comparator 308. A high-order address field (e.g. a segment address field) of the logical address register 304 is applied to the comparator 306 through a line 301, and when inputs to the comparator 306 are equal, it produces a signal on a line 307. The virtual space number assigned to the virtual space being selected is supplied from the virtual space number register 205 (FIG. 2) to the comparator 308. The comparator 308 comprises a high-order bit comparator 308-1 and a low-order bit comparator 308-2, and when the high-order bit fields of the virtual space number are equal, the comparator 308 produces a signal on a line 309 while it produces a signal on a line 310 when the low-order bit fields are equal. When the equality signals are produced on the lines 307, 309 and 310 and valid bit V indicates the valid entry, an AND gate 311 produces an output signal so that an AND gate 312 is opened to register the real address in the RA field to a high-order bit field of a real address register 313. The low-order bit field of the logical address register 304 is registered to a low-order bit field of the real address register 313. In this manner, for the logical address registered in the logical address register 304, the real address is registered to the real address register 313 in response to the equality of the logical addresses and the equality of the virtual space numbers.

On the other hand, when the AND gate 311 is not opened by the non-equality of any of the comparators 306, 308-1 and 308-2 or the indication of the invalidity by the valid bit, an output of an inverter 314 indicates that a logical address corresponding to the logical address of the logical address register 304 is not registered in the high-speed address translator 300. This is informed to the control unit, not shown, and AND gates 315, 316 and 317 are opened. When the real address is determined using the address translation table described above, the real address is supplied to a line 318 and, through an AND gate 317, stored in the RA field of the entry indicated by the middle-order address field of the logical address register 304. The high-order address field of the logical address register 304 is stored in the LA field through the AND gate 315. The virtual space number of the virtual space number register 205 is stored in the ACT field through the AND gate 316. At the same time, the corresponding valid bit V is set to "1".

Now, when the virtual space purge is instructed from the add-one adder 214 (FIG. 2) to the control unit, not shown, through the line 242, the control unit supplies a signal onto a line 319 to activate the AND gate 320 and cause a counter 322 to count up sequentially from zero to m-1 count through a line 321. The output of the counter 322 is applied to the decoder 305 which sequentially selects the high-speed address translator 300 from 0-th entry to (m-1)-th entry and reads out the contents thereof. When the equality signal is produced from the high-order bit comparator 308-1 for the virtual space number and the corresponding V field indicates the validity, the AND gate 320 is opened to set the valid bit V of the corresponding entry to "0" to indicate the invalidity. That is, as a result of stacking of the new STO address to the STO address stack 200 and the assignment of the virtual space number, if the assigned number overlaps the existing virtual space number, the address pair registered in the high-speed address translator 300 together with that existing space number is invalidated.

FIG. 5 illustrates the operation of the embodiments shown in FIGS. 2 and 3 in a more easily understood form and it shows a relation among the STO address register 203, the i-th column of the STO address stack 200 and the virtual space number register 205. A row No. 0 shows an initial state in which V0, V1 and the CODE field of the STO address stack as well as the virtual space number register are all "0". In row No. 1, when an STO address "Ai" (where A is the content of the high-order bit field of the STO address and i is the content of the low-order bit field) is set in the STO address register, "A" is registered to the A0 field of the STO address stack and V0 is set to "1". As a result, a virtual space number "i000" is assigned to the STO address "Ai". Then, as shown in row No. 2, when an STO address "Bi" is set to select a new virtual space, "B" is stored in A1 and V1 is set to "1". A0, V0 and the CODE field do not change. As a result, a virtual space number "i100" is assigned to the STO address "Bi".

Then, as shown in now No. 3, when an STO address "Ci" is set, "C" is stored in the AO field to take place of "A". Thus, the CODE field is incremented by one to change to "01" and Vl is set to "0". As a result, a virtual address number "i001" is assigned to the STO address "Ci". In a similar manner, as it proceeds to row No. 8 so that eight new STO addresses are set, the content of the i-th column of the STO address stack assumes "GlHlll" and the virtual space number register indicates "i111" assigned to an STO address "Hi". Then, as shown in row No. 9, when an STO address "Ji" is set, "J" is stored in the AO field and the CODE field is incremented by one to change to "00" and the assigned virtual space number becomes "i000" which is identical to the virtual space number assigned to the STO address "Ai" shown in the row No. 1. At this time, since the add-one adder 214 produces a carry, the virtual space purge is instructed. It is in that entry having the high-order bit of the virtual space number of "i" that the valid bit is indicated as invalid in the high-speed address translator 300. They are address pairs which correspond to eight virtual spaces at most.

As seen from FIG. 5, noting one column of the STO address stack, there are two STO addresses which can be stacked while there are eight numbered and identifiable virtual spaces, and the virtual space purge is effected simultaneously for those eight virtual spaces so that the virtual space purge for the high-speed address translator is instructed each time the eight virtual spaces have been used. Accordingly, the frequency of purging is reduced by the factor of eight to four.

This can be expressed by general formulas in the following manner.

Assuming that;

the number of low-order bits of the STO address register: a (a=1, 2, ... ), the number of rows of the STO address stack: $2^b$ (b=1, 2, ... ), and the number of bits of the CODE field: c (c=1, 2, ... ), then there are $2^b$ STO addresses which can be stacked in one column while there are $2^{b+c}$ virtual spaces which are numbered and identifiable. Consequently, the virtual space purge is instructed each time a new virtual space in excess of $2^{b+c}$ is selected.

Noting the entire STO address stack, there are $2^{a+b}$ STO addresses which can be stacked in the STO address stack while there are $2^{a+b+c}$ virtual space numbers assigned. The frequency of the virtual space purge depends on the value of the low-order bit of the STO address, that is, the frequency of the usage of each column, assuming that the columns are evenly used, $2^a$ purge insructions are issued, in average, while $2^{a+b+c}$ virtual spaces are selected.

FIG. 5 also shows the state after the purge in the row No. 9 has been instructed. For example, as shown in row No. 13, if an STO address which is still present in the STO address stack is selected, the virtual space number previously assigned is used without being changed. Furthermore, as shown in row No. 15, if the STO address which has once registered in the STO address stack (at No. 12) and then purged (at No. 14) is again generated, a virtual space number different from the previous one is assigned.

In the embodiments shown in FIGS. 2 and 3, the number of bits in the CODE field is two, but any number of bits may be used. When the number of bits increases, the frequency of the virtual space purge is further lowered but the number of bits in each column of the STO address stack and the number of bits in each entry of the high-speed address translator increase. Therefore, it is desirable that the number of bits of the CODE field is decided in compromise between those factors.

Furthermore, during the virtual space purge, the high-order bit of the virtual space number is compared. Instead, the content of the bit corresponding to at least a virtual space code field and other than the least significant bit position may be compared. For example, in the row No. 9 of FIG. 5, the bits of the purge indication "i" other than two low-order bits may be "i0". In this case, those having the virtual space numbers corresponding to the rows No. 1, No. 3, No. 5 and No. 7 are invalidated. In the row No. 10, the purge instruction "i1" is again issued and those for the rows No. 2, No. 4, No. 6 and No. 8 are invalidated. In this case, therefore, the frequency of the purge is twice as high as that in FIG. 5 and the virtual spaces which are simultaneously invalidated are reduced by half.

FIG. 6 shows another embodiment of the present invention and it shows the position at which the virtual space number is set to the virtual space number register. An STO address stack 600 comprises 2n entries each consisting of n columns×2 rows, like the embodiment of FIG. 2, but in the embodiment of FIG. 6, each entry includes the CODE field and each column includes a utilization bit U. One column of the STO address stack 600 is selected and read by a low-order bit of an STO address register 603. The contents of AO and A1 of the column are compared in comparators 610 and 611 with a high-order bit field of the STO address register 603 which is supplied through a line 601. If one of the contents is equal to the high-order bit field, a corresponding AND gate 606 or 607 is opened and the content of CODE 0 or CODE 1 is set to a low-order bit field 605-3 of a virtual space number register 605. An encoder 613 produces a "0" output when the comparator 610 produces an equality signal, and a "1" output when the comparator 611 produces the equality signal, and sets it to a middle-order bit field 605-2 of the virtual space number register 605. The low-order bit of the STO address is set to a high-order bit field 605-1 of the register 605 when the comparator 610 produces the equality signal, the U bit is set to "1", and when the comparator 611 produces the equality signal, the U bit is set to "0" to indicate which one of the entries has been used last.

When none of the comparators produce the equality signal, the high-order bit of the STO address is set to AO if U=0 and to A1 if U=1, and the CODE field of that entry is incremented by one.

FIG. 7 corresponds to FIG. 6 and shows a similar chart to that of FIG. 5. The characteristics in FIG. 7 reside in that, in the row No. 9, when the virtual space number assigned to the STO address "Ji" becomes "i000" which is identical to the number assigned to the STO address "Ai" in the row No. 1, the virtual space purge is instructed, but it is not those having the high-order bit of "i" but those having the number of "i0" in the same high-order bit and middle-order bit as "i0" of the fields 605-1 and 605-2 of the virtual space number register 605 that are purged in the high-speed address translator. In the row No. 10, when the virtual space number assigned to the STO address "Ki" becomes "i100", the virtual space purge is instructed. In this case, "i1" is used.

In row No. 9', when the number "i000" is assigned to the STO address "Ji" in place of No. 9, the purge is instructed by "i" as in the case of FIG. 5. In this case, AJ is invalidated, and the CODE 1 is changed to "00". In row No. 10', the purge is not instructed.

The characteristic feature of providing the U bit in FIG. 7 is found in row No. 13. In spite of the fact that Ki has been registered in the STO address stack later than Li, since Ki has been used recently, Mi purges Li by the U bit in the row No. 13 and Mi is registered.

As seen from FIG. 7, an advantage of the configuration of FIG. 6 resides in that Al is not invalidated during the registration to AO in the row No. 3.

Figure 8:
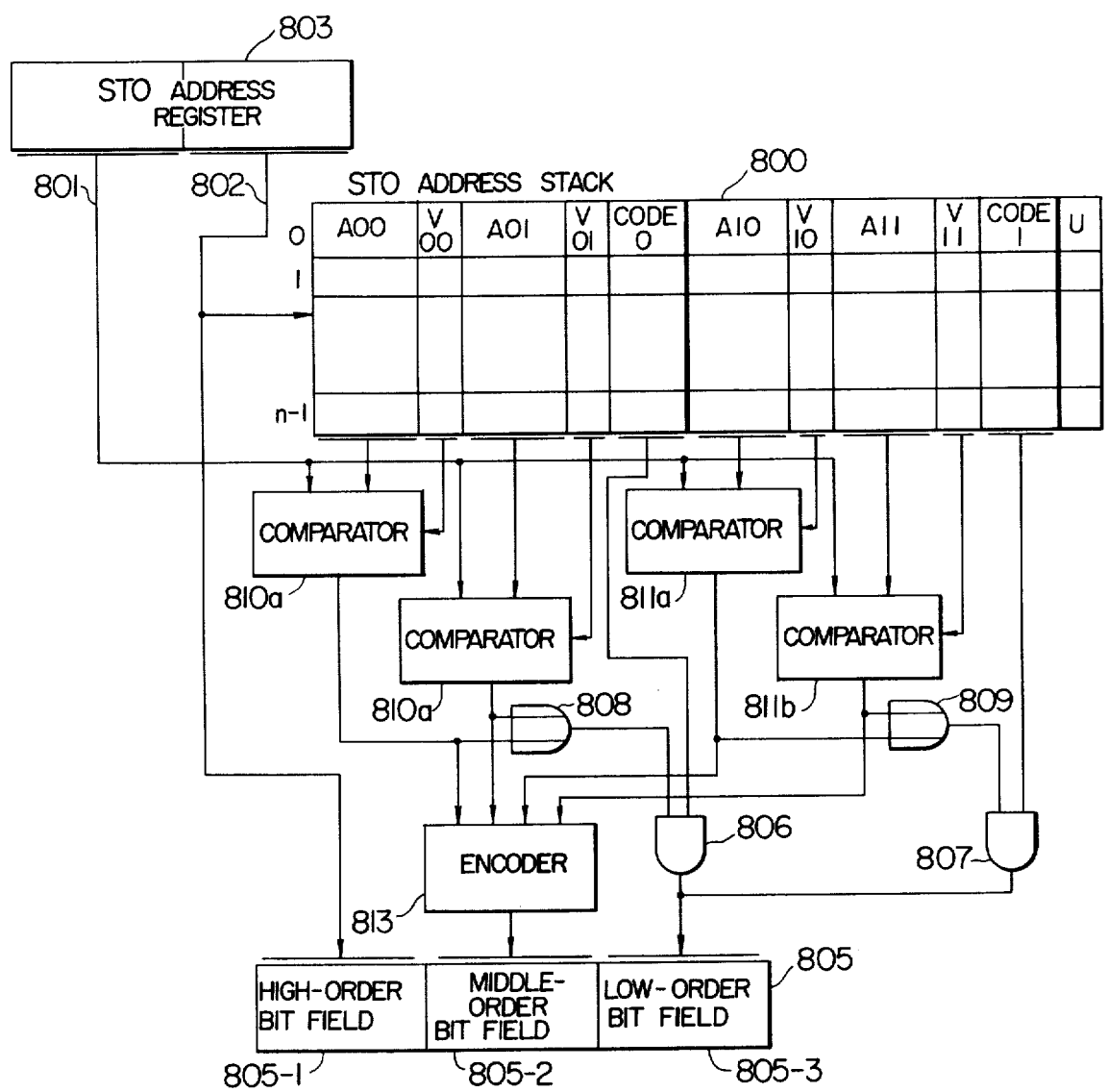
FIG. 8 is a block diagram of an STO address stack and peripheral circuits according to another embodiment of the present invention.

FIG. 8 shows another embodiment of the present invention. Each column of an STO address stack 800 in FIG. 8 has four entries and the STO address stack includes two sets each having the CODE 0 for A00 and A01 and the CODE 1 for A01 and A11. Thus, it takes a form of a combination of the embodiments of FIGS. 2 and 6. One column of the STO address stack 800 is selected by a low-order bit field of an STO address register 803, and the content of A00–A11 is compared with high-order bits of the STO address by comparators 810a, 810b, 811a and 811b. If one of the comparators produces an equality signal, it is passed through OR gate 808 or 809 to open AND gate 806 or 807 so that the content of CODE 0 or COCE 1 is set to a low-order bit field 805-3 of the virtual space number register 805. An encoder 813 produces a 2-bit code of 37 00" when the comparator 810a produces the equality signal, "01" when the comparator 810b produces the equality signal, "10" when the comparator 811a produces the equality signal, and "11" when the comparator 811b produces the equality signal. They are set to a middle-order bit field 805-2 of the register 805. The low-order bit of the STO address is set to a high-order bit field 805-1.

FIG. 9A shows a similar chart to those of FIGS. 5 and 7. In rows No. 17 and No. 18, the purge is instructed and the purge is effected by "i0" and "i1". In row No. 17', the purge is effected only by "i", in place of the row No. 17.

FIG. 9B shows an example in which the U bit in FIG. 8 is omitted.

What is claimed is:

1. A multiple virtual storage control system for a data processing system for handling a plurality of virtual spaces and having a translation table for translating virtual addresses indicative of addresses in the virtual spaces to real addresses, comprising:
    first means for assigning a virtual space number to a supplied first address of said translation table;
    said first means including a plurality of first storage locations for storing said first address and said virtual space number assigned to said first address;
    said first means assigning, upon absence of said supplied first address in said first storage locations, a virtual space number to said first address, storing said first address and said virtual space number assigned to the first address in said first storage location and outputting said virtual space number;
    said first means outputting, upon presence of said supplied first address in said first storage locations, the virtual space number assigned to said first address; and
    second means for producing real addresses which correspond to the supplied virtual addresses and the virtual space numbers, said second means including a plurality of second storage locations for storing the real addresses and the virtual space numbers in correspondence thereto,
    the improvement wherein said first means comprises output means for assigning a predetermined number of the virtual space numbers which predetermined number is larger in number than the number of said first storage locations, said output means including means for producing a signal when a predetermined virtual space number is assigned so as to indicate that the predetermined number of virtual space numbers larger than the number of first storage locations has been assigned and that a new virtual space in excess of the predetermined number of virtual space numbers has been selected, and said second means comprises invalidating means responsive to the signal from said output means for invalidating the content of those second storage locations which hold the virtual space numbers corresponding to a plurality of virtual space numbers in accordance with the virtual space number from said first means.

2. A multiple virtual storage control system according to claim 1, wherein said first means comprises means using a portion of bits constituting the first address as a portion bit constituting the virtual space number.

3. A multiple virtual storage control system for a data processing system for handling a plurality of virtual spaces and having a translation table for translating virtual addresses indicative of addresses in the virtual spaces to real addresses, comprising:
    first means for assigning a virtual space number to a supplied first address of said translation table;
    said first means including a plurality of first storage locations for storing said first address and said virtual space number assigned to said first address;
    said first means assigning, upon absence of said supplied first address in said first storage locations, a virtual space number to said first address, storing said first address and said virtual space number assigned to the first address in said first storage location and outputting said virtual space number;
    said first means outputting, upon presence of said supplied first address in said first storage locations, the virtual space number assigned to said first address; and
    second means for producing real addresses which correspond to the supplied virtual addresses and the virtual space numbers, said second means including a plurality of second storage locations for storing the real addresses and the virtual space numbers in correspondence thereto,
    the improvement wherein said first means comprises:
    a first register to which said supplied first address is loaded, said first address including a first portion and a second portion excluding the first portion;
    storage means having the plurality of first storage locations each adapted to store the second portion of said first address and a virtual space code constituting a portion of the virtual space number;
    addressing means for addressing said storage means by the first portion of the first address of said first register;
    a second register to which the virtual space number assigned to the first address loaded to said first register is loaded, said virtual space number including a first portion and a second portion, the first portion of the first address of said first register being loaded to said second register as the second portion of said virtual space number; and means for loading the virtual space number, said loading means including means for assigning a virtual space number larger in number than the number of said first storage locations by incrementing said virtual space code, said loading means loading the virtual space code in the storage location addressed by said addressing means to said second register as the first portion of said virtual space number when the second portion corresponding to the second portion of the first address in said first register is present at that storage location, said loading means incrementing the virtual space code in the storage location addressed by said addressing means and loading the incremented virtual space code to said second register as the first portion of said virtual space number when the second portion corresponding to the second portion of the first address in said first register is not present at that storage location, said loading means storing the incremented virtual space code and the second portion of the first address of said first register in said storage means, said loading means producing the signal when an overflow occurs as a result of the increment; and said second means comprises means responsive to the signal from said first means, for invalidating the content of the second storage location having the virtual space number corresponding to the second portion of the virtual space number of the second register of said first means.

4. A multiple virtual storage control system for a data processing system for handling a plurality of virtual spaces and having a translation table for translating virtual addresses indicative of addresses in the virtual spaces to real addresses, comprising:

first means for assigning a virtual space number to a supplied first address of said translation table;

said first means including a plurality of first storage locations for storing said first address and said virtual space number assigned to said first address;

said first means assigning, upon absence of said supplied first address in said first storage locations, a virtual space number to said first address, storing said first address and said virtual space number assigned to the first address in said first storage location and outputting said virtual space number;

said first means outputting, upon presence of said supplied first address in said first storage locations, the virtual space number assigned to said first address; and second means for producing real addresses which correspond to the supplied virtual addresses and the virtual space numbers, said second means including a plurality of second storage locations for storing the real addresses and the virtual space numbers in correspondence thereto, the improvement wherein said first means comprises:
a first register to which the supplied first address is loaded, said first address including a first portion and a second portion excluding said first portion;

storage means having the plurality of storage locations each including a plurality of first areas for storing second portions of the plurality of first addresses, a plurality of second areas for indicating the validity of the contents of said first areas and a third area for storing a virtual space code constituting a portion of said virtual space number, said virtual space code having a number of bits capable of indicating a larger number than the number of said first areas;

addressing means for addressing said storage means by the first portion of the first address of said first register;

a second register to which the virtual space number assigned to the first address loaded to said first register is loaded, said virtual space number including first, second and third portions, the first portion of the first address of said first register being loaded to said second register as the second portion of said virtual space number;

means including a plurality of comparing means for comparing the contents of the first areas at the first storage location addressed by said addressing means with the second portion in said first register to produce equal/unequal signals, said means loading the code indicative of the comparing means which produced the equal signal to said second register as the third portion of said virtual space number and loading the content of the third area of the first storage location addressed by said addressing means to said second register as the first portion of said virtual space number; and means for storing the second portion of said first register in the first area corresponding to the second area which indicates the invalidity of the first storage location and indicating the validity of the corresponding second area when all of said comparing means produce the unequal signals and at least one of the second areas of the addressed first storage location indicates the invalidity, said means incrementing the virtual space code in the third area of said first storage location and loading the incremented virtual space code to said second register as the first portion of said virtual space number and storing the second portion of said first register in the first area and indicating the invalidity of the corresponding second area when all of the second areas at the addressed first storage location indicate the validity, said means producing the signal when an overflow occurs as a result of the increment, said second means comprises means responsive to said signal from said first means, for invalidiating the content of the second storage location having the virtual space number corresponding to the second portion of the virual space number of the second register of said first means.

5. A multiple virtual storage control system for a data processing system for handling a plurality of virtual spaces and having a translation table for translating virtual addresses indicative of addresses in the virtual spaces to real addresses, comprising:

first means for assigning a virtual space number to a supplied first address of said translation table;

said first means including a plurality of first storage locations for storing said first address and said virtual space number assigned to said first address;

said first means assigning, upon absence of said supplied first address in said first storage locations, a virtual space number to said first address, storing said first address and said virtual space number assigned to the first address in said first storage location and outputting said virtual space number;

said first means outputting, upon presence of said supplied first address in said first storage locations, the virtual space number assigned to said first address; and second means for producing real addresses which correspond to the supplied virtual addresses and the virtual space numbers, said second means including a plurality of second storage locations for storing the real addresses and the virtual space numbers in correspondence thereto, the improvement wherein said first means comprises:

a first register to which the supplied first address is loaded, said first address including a first portion and a second portion excluding said first portion;

storage means having the plurality of first storage locations each including a plurality of areas for storing the second portion of said first address and a virtual space code constituting a portion of said virtual space number;

a second register to which the virtual space number assigned to the first address loaded to said first register is loaded, said virtual space number including first, second and third portions, the first portion of the first address of said first register being loaded to said second register as the second portion of said virtual space numnber;

addressing means for addressing said storage means by the first portion of the first address of said first register;

comparing means for comparing the second portion of the first address in the areas at the first storage location addressed by said addressing means with the second portion of the first address in said first register to produce equal/unequal signals;

output means including means for assigning a virtual space number larger in number than the number of said first storage locations by incrementing said virtual space code, and responsive to the unequal signal from said comparing means for incrementing the virtual space code in the incremented virtual space code and the second portion of the first address of said first register in that area, said means producing the signal when an overflow occurs as a result of the increment; and means responsive to the equal signal from said comparing means for loading the code indicative of the identity area to said second register as the third portion of said virtual space number, and loading the virtual space code in the identity area to said second register as the first portion of said virtual space number; and said second means comprises means responsive to said signal from said first means for invalidating the content of the second storage location having the virtual space number corresponding to the second portion of the virtual space number of said second register of said first means.

6. A multiple virtual storage control system according to claim 5, wherein said invalidating means invalidates the content of the second storage location having the virtual space number corresponding to the second and third portions of the virtual space number of said second register of said first means.

* * * * *